US007228792B2

(12) United States Patent
Crawford et al.

(10) Patent No.: US 7,228,792 B2
(45) Date of Patent: Jun. 12, 2007

(54) COOKER WITH LATCHING DRIP TRAY FOR SELECTIVELY OPENING AND CLOSING GREASE DISPENSING APERTURES IN COOKING PAN

(75) Inventors: Alan D. Crawford, Burbank, CA (US); Robert A. DeMars, Woodland Hills, CA (US); Spencer L. Mackay, Agoura Hills, CA (US); John R. Petersen, Thousand Oaks, CA (US)

(73) Assignee: Original Ideas, Inc., Calabasas, CA (US)

( * ) Notice: Subject to any disclaimer, the term of this patent is extended or adjusted under 35 U.S.C. 154(b) by 302 days.

(21) Appl. No.: 10/840,342

(22) Filed: May 5, 2004

(65) Prior Publication Data

US 2005/0247211 A1 Nov. 10, 2005

(51) Int. Cl.
*A47J 37/10* (2006.01)

(52) U.S. Cl. .............................. 99/400; 99/408; 99/425; 99/446

(58) Field of Classification Search ................ 99/446, 99/425, 444, 400, 408, 299, 306; 220/571, 220/501, 573.5, 573.4, 4.03, 4.26, 23.87, 220/23.91, 23.86, 912
See application file for complete search history.

(56) References Cited

U.S. PATENT DOCUMENTS

| | | | |
|---|---|---|---|
| 718,367 A | 1/1903 | Merritt | |
| 2,028,649 A | 1/1936 | Conroy | |
| 2,732,696 A | 1/1956 | Baker | |
| 2,932,293 A | 4/1960 | Rassieur | |
| 3,106,887 A * | 10/1963 | Bryl | 99/425 |
| 4,352,324 A | 10/1982 | Noh | |
| 5,323,693 A | 6/1994 | Collard et al. | |
| 5,372,274 A * | 12/1994 | Freedland | 220/571 |
| 5,467,696 A * | 11/1995 | Everhart | 99/425 |
| 5,584,236 A * | 12/1996 | Margolis | 99/425 |
| 5,967,024 A | 10/1999 | DeMars | |
| 6,289,793 B1 | 9/2001 | Hu et al. | |
| 6,327,965 B1 * | 12/2001 | Lin Tien | 99/299 |

FOREIGN PATENT DOCUMENTS

GB 2 261 360 A 5/1993

\* cited by examiner

*Primary Examiner*—Reginald L. Alexander
(74) *Attorney, Agent, or Firm*—Hogan & Hartson LLP

(57) ABSTRACT

A cooker has a pan of circular configuration with an open upper end receiving a circular lid and a bottom having apertures therein. A disk shaped drip tray disposed below the pan and having upstanding lugs thereon is selectively moved between raised and lowered positions using opposite latching mechanisms which adjustably couple the drip tray to the pan. In the raised position, the drip tray engages the bottom of the pan and the lugs on the drip tray extend into and close the apertures in the pan. In the lowered position, the lugs are removed from the apertures, permitting greases, fats and similar substances to drain through the apertures and onto the drip tray. The latching mechanisms permit separation of the drip tray from the pan for separate cleansing thereof such as by placing in a dishwasher. When food cooked in the pan is ready to be served, the pan and attached drip tray are placed within an opening in a circular serving tray which has removable trays positioned about the circumference thereof for holding food items such as toppings for the food cooked in the pan. An electrical heating element embedded within the bottom of the pan provides heat for cooking.

8 Claims, 6 Drawing Sheets

COOKER WITH LATCHING DRIP TRAY FOR SELECTIVELY OPENING AND CLOSING GREASE DISPENSING APERTURES IN COOKING PAN

BACKGROUND OF THE INVENTION

1. Area of the Art

The present invention relates to cooking appliances, and more particularly to appliances in which apertures in the bottom of a cooking pan are selectively opened and closed to provide discharge of greases and other such liquids which accumulate within the pan during the cooking process.

2. Description of the Prior Art

It is known in the art to provide a cooking appliance in which food is cooked in a pan having a removable lid and which is mounted on a base for collecting greases which are drained from the pan during the cooking process. U.S. Pat. No. 6,289,793 of Hu, et al. describes such a cooking appliance.

It is also known in the art to provide a pan or other cooking enclosure having apertures therein which are selectively opened and closed to drain juices, fats and the like from the cooking pan. U.S. Pat. No. 2,028,649 of Conroy discloses several different embodiments of such apparatus.

It is still further known in the art to provide various arrangements for collecting and disposing of juices, fats and other such material in cooking appliances. Examples of such arrangements are provided by U.S. Pat. No. 5,967,024 of DeMars, U.S. Pat. No. 5,323,693 of Collard et al., U.S. Pat. No. 4,352,324 of Noh, U.S. Pat. No. 2,932,293 of Rassieur, U.S. Pat. No. 2,732,696 of Baker, U.S. Pat. No. 718,367 of Merritt, and British Patent No. 2,261,360 of Lin.

SUMMARY OF THE INVENTION

The present invention provides a cooking appliance which permits apertures in the bottom of a cooking pan to be selectively opened and closed as desired. Opening of the apertures provides for discharge of greases, fats and other such substances which accumulate at the bottom of the pan during the cooking process. The appliance is of relatively simple construction, is easy to operate and readily separates into individual parts for cleaning after use.

In a preferred form of cooking appliance according to the invention, a cooker includes a pan of generally circular configuration having an open upper end on which a removable circular lid is placed. A circular drip tray mounted below and coupled to the pan by opposite latching mechanisms is selectively movable between raised and lowered positions using the latching mechanisms. When in the raised position, the drip tray engages the pan and a plurality of upstanding lugs on the drip tray extend into apertures in the bottom of the pan so as to close off such apertures. Movement of the drip tray into the lowered position removes the upstanding lugs on the drip tray from the apertures at the bottom of the pan. During the cooking process, movement of the drip tray into the lowered position so as to open the apertures permits discharge of greases and similar substances onto the drip tray such as during cooking of meat in the pan. Movement of the drip tray into the raised position to close off the apertures is done during the cooking process in conjunction with the addition of sauces to meat which is being cooked in the pan.

The latching mechanisms include a pair of spring loaded latches mounted at opposite sides of the drip tray for latching engagement with mating latch receiving brackets mounted on opposite sides of the pan. The latches are resiliently mounted on the drip tray by leaf springs. Each latch has a tab projecting from an inner surface thereof for engagement with either of upper and lower ledges formed in the facing surfaces of the latch receiving brackets to hold the drip tray in the raised or lowered position. The latches include knobs which extend through apertures in the latch receiving brackets. Manually depressing the knobs overcomes the resilience of the latches to unseat the tabs from the ledges in the latch receiving brackets so as to permit movement of the drip tray between the raised and lowered positions.

When food in the pan has been cooked and is ready to serve, the drip tray and the attached pan may be placed within a mating opening in a serving tray of generally circular configuration. The serving tray has a plurality of removable trays disposed around the circumference thereof. Toppings and other such foods may be placed within the removable trays for use with the food which has been cooked in the pan.

DETAILED DESCRIPTION OF THE INVENTION

Figure 1:
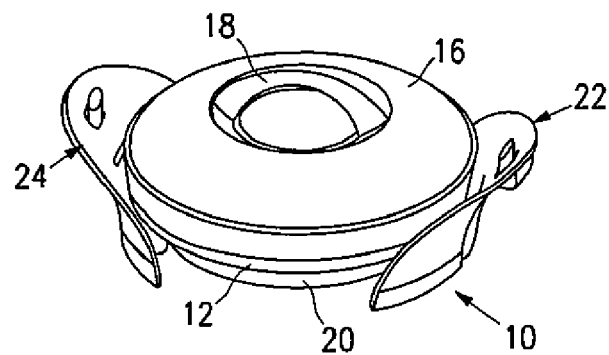
FIG. 1 is a perspective view of a cooker in accordance with the invention.

FIGS. 1–12 show a preferred embodiment of a cooker 10 in accordance with the invention. As best shown in the exploded perspective view of FIG. 2, the cooker 10 includes a pan 12 of generally circular configuration having an open upper end 14. A circular lid 16 is removably placed over the open upper end 14 of the pan 12. The lid 16 has a handle 18 in a central portion thereof for ease of handling the lid 16. The cooker 10 also includes a drip tray 20 which is generally disk-shaped. The drip tray 20 is coupled to the pan 12 by opposite latching mechanisms 22 and 24. As described in detail hereafter, the latching mechanisms 22 and 24 are manually operated to latch the drip tray 20 in raised and lowered positions relative to the pan 12.

Figure 2:
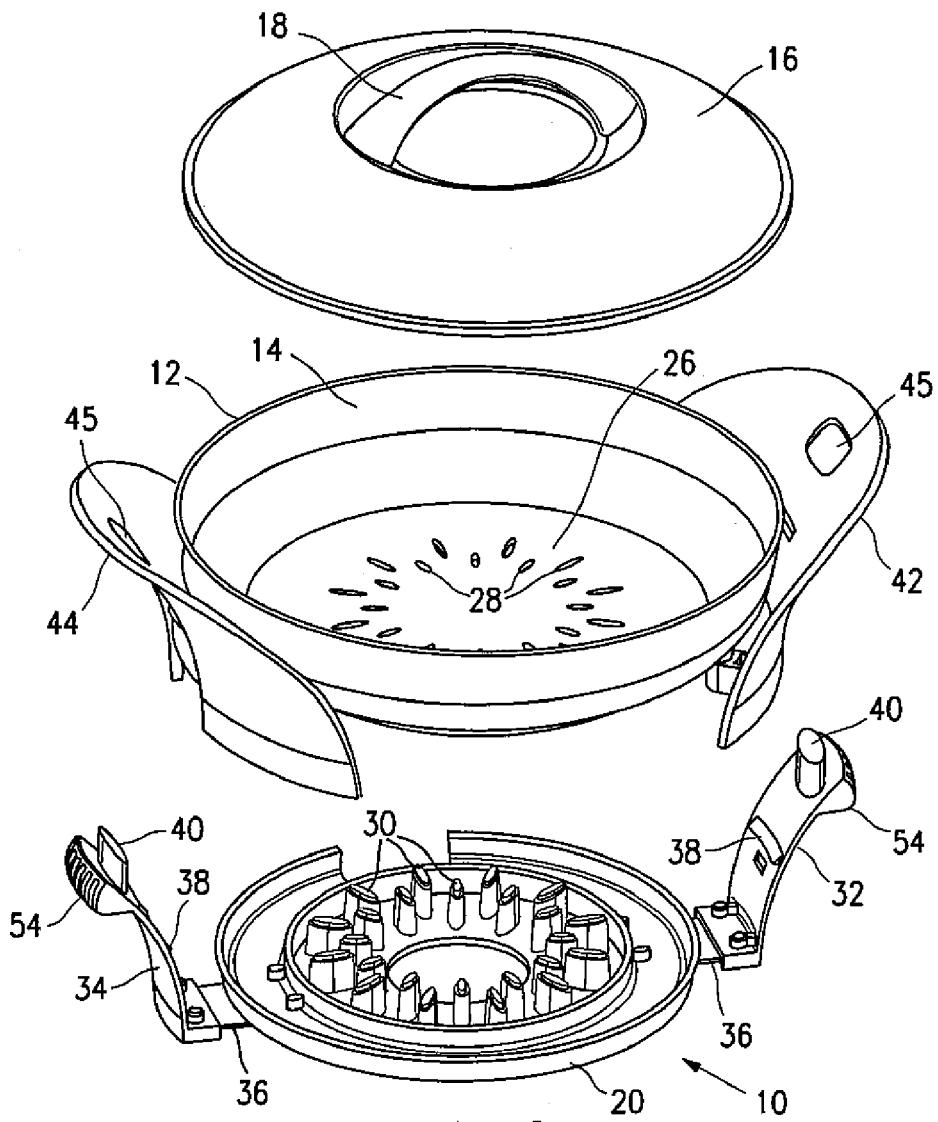
FIG. 2 is an exploded perspective view of the cooker of FIG. 1.
Figure 3:
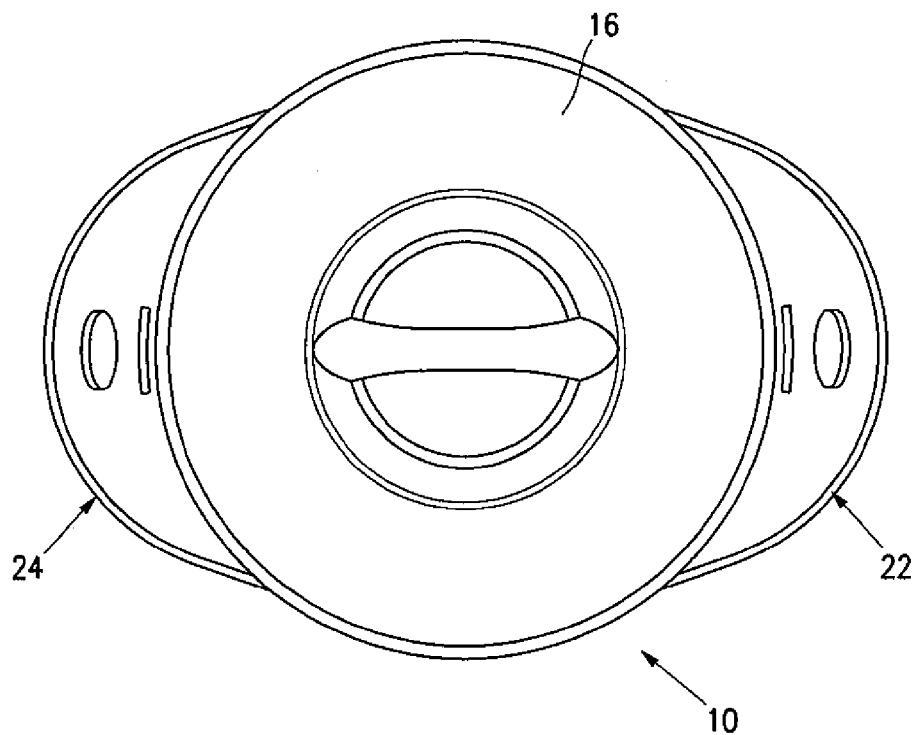
FIG. 3 is a top view of the cooker of FIG. 1.
Figure 4:
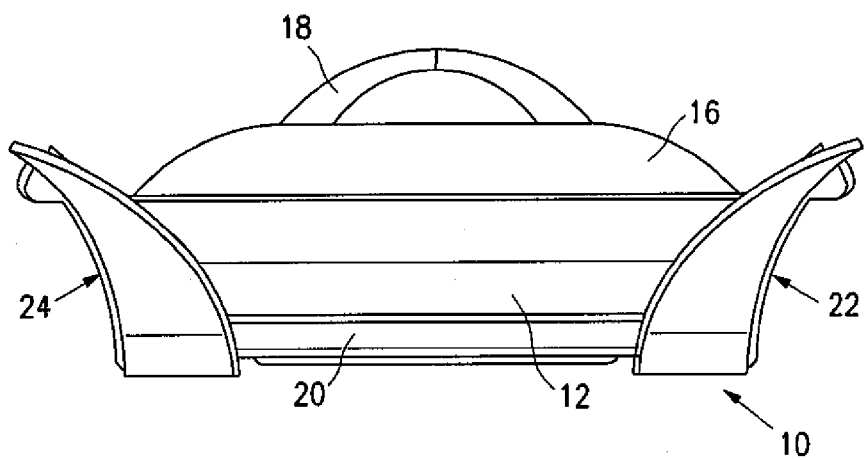
FIG. 4 is a front view of the cooker of FIG. 1.
Figure 5:
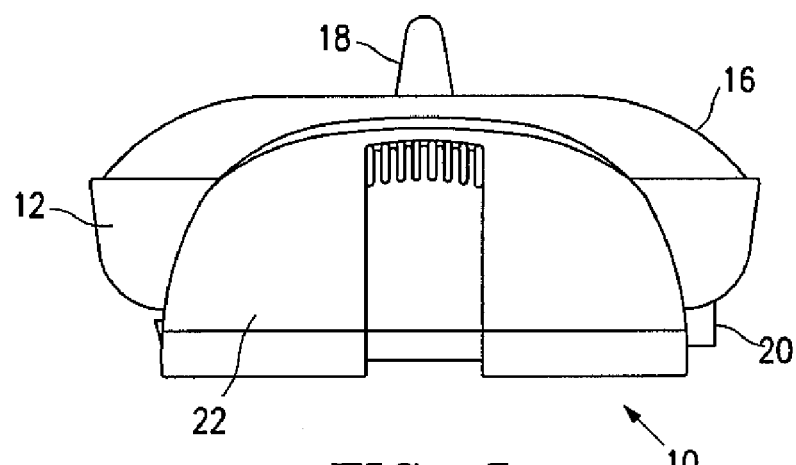
FIG. 5 is a right side view of the cooker of FIG. 1.
Figure 6:
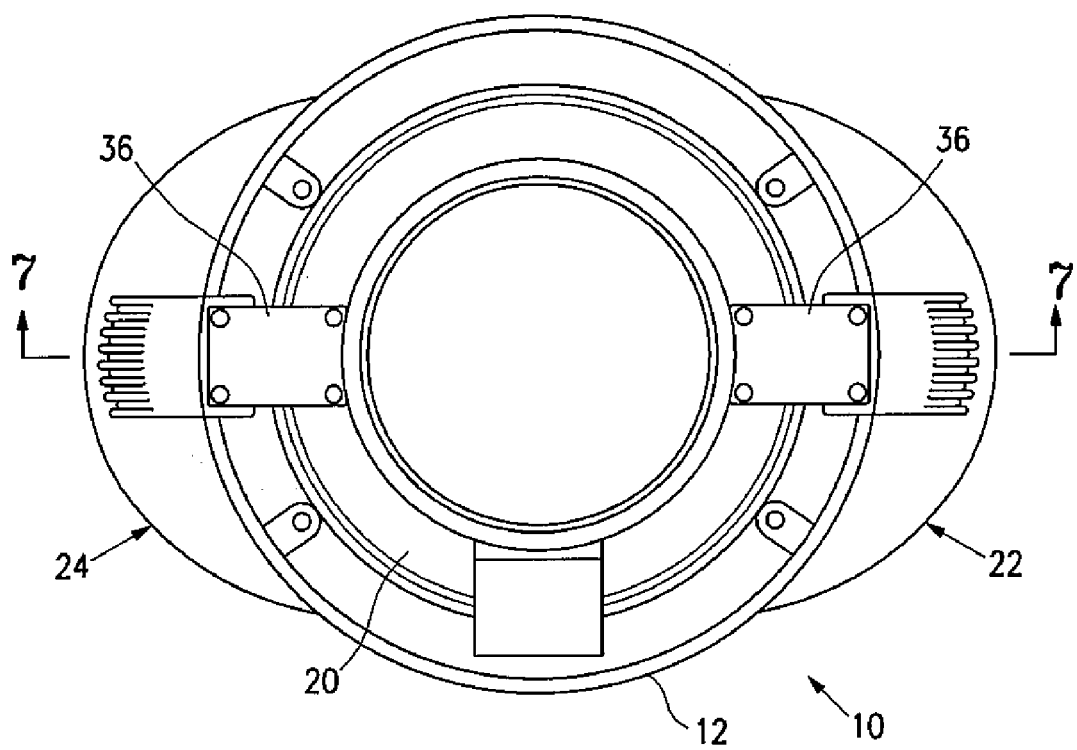
FIG. 6 is a bottom view of the cooker of FIG. 1.

As shown in FIG. 2, the pan 12 has a bottom 26 that is provided with a plurality of apertures 28 therethrough. When the latching mechanisms 22 and 24 are manipulated so as to position the drip tray 20 in the raised position in which it engages the pan 12, a plurality of upstanding lugs 30 on the drip tray 20 extend into and close off the apertures 28. In this position, greases and other liquids at the bottom of the pan 12 cannot discharge through the apertures 28. Conversely, when the drip tray 20 is positioned in the lowered position by manipulation of the latching mechanisms 22 and 24, the upstanding lugs 30 are removed from and are disposed below the apertures 28, thereby opening the apertures 28 so that grease and other liquids at the bottom 26 of the pan 12 may discharge through the apertures 28.

The latching mechanisms 22 and 24 include a pair of spring loaded latches 32 and 34 mounted on opposite sides of the drip tray 20. The latches 32 and 34 are resiliently mounted on the drip tray 20 by leaf springs 36. Each leaf spring 36 is coupled at one end to the lower end of the latch 32 or 34 with the opposite end thereof being mounted on the drip tray 20. Each of the latches 32 and 34 also includes a tab 38 projecting from an inner surface thereof. Mounted above the tab 38 and also projecting from the inner surface of each latch 32 and 34 is a knob 40.

Figure 7:
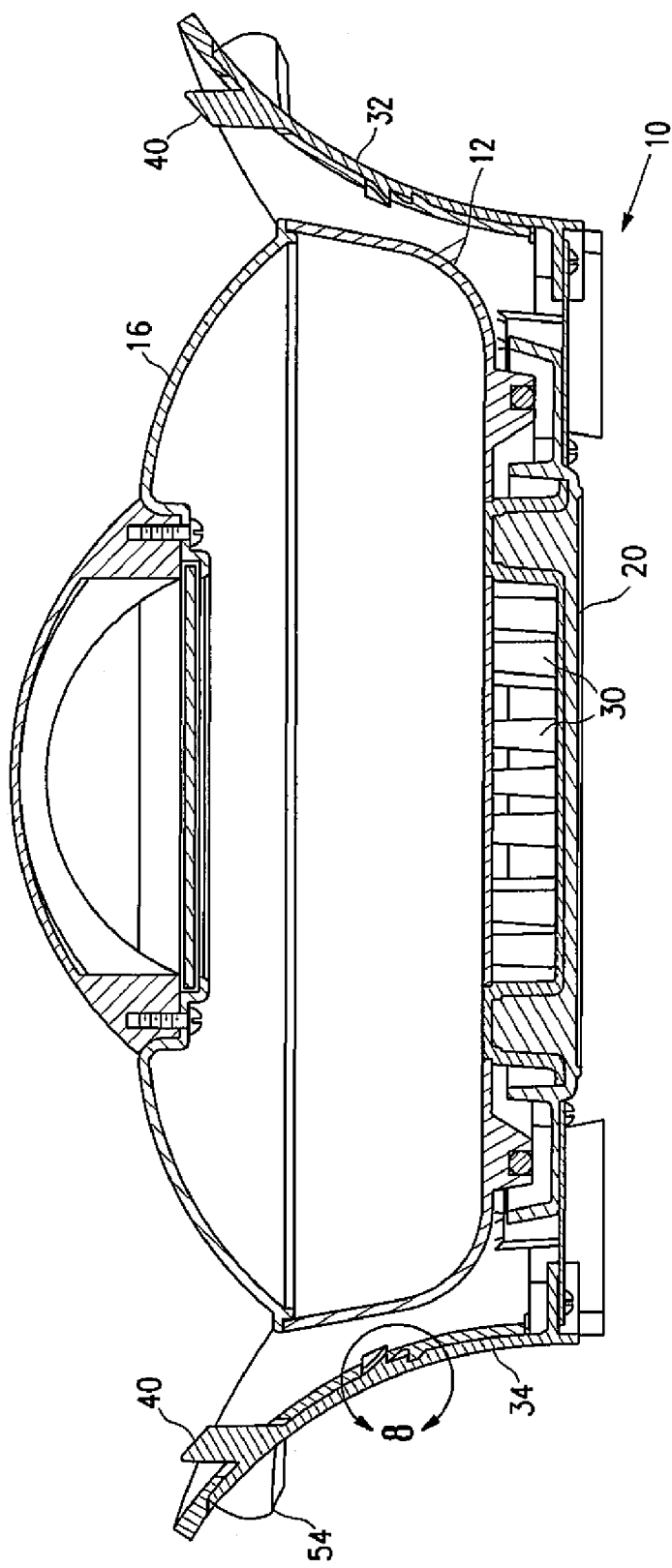
FIG. 7 is a sectional view of the cooker of FIG. 1 with the drip tray of the cooker latched in the raised position so as to close off apertures in the bottom of the pan of the cooker.
Figure 8:
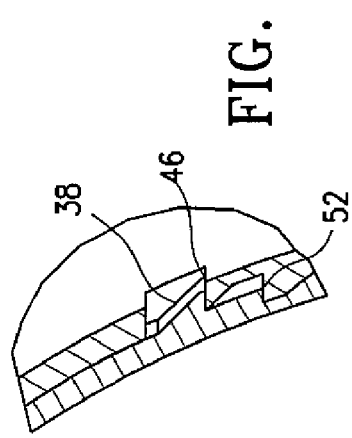
FIG. 8 is a detailed view of a portion of the sectional view of FIG. 7, illustrating the manner in which a tab on one of the spring loaded latches engages and seats on an upper ledge of a mating latch receiving bracket when the drip tray is in the raised position.

In addition to the latches 32 and 34, the latching mechanisms 22 and 24 also include a pair of latch receiving brackets 42, and 44 mounted on opposite sides of the pan 12. The spring loaded latches 32 and 34 resiliently engage the latch receiving brackets 42 and 44 to hold the drip tray 20 in the raised or lowered positions. The raised position is shown in FIG. 7 and is characterized by the circular drip tray 20 being held in engagement with the bottom of the pan 12 so that the upstanding lugs 30 extend into and close off the apertures 28 in the bottom 26 of the pan 12. In the raised position, each knob 40 of the latches 32 and 34 extends through and beyond an aperture 45 in the latch receiving brackets 42 and 44.

Each of the spring loaded latches 32 and 34 has a tab 38 which projects from an inner surface thereof. The drip tray 20 is held in the raised position by engagement of the tabs 38 with upper ledges 46 formed in a surface of each of the latch receiving brackets 42 and 44. This is shown in the detailed view of FIG. 8.

Figure 9:
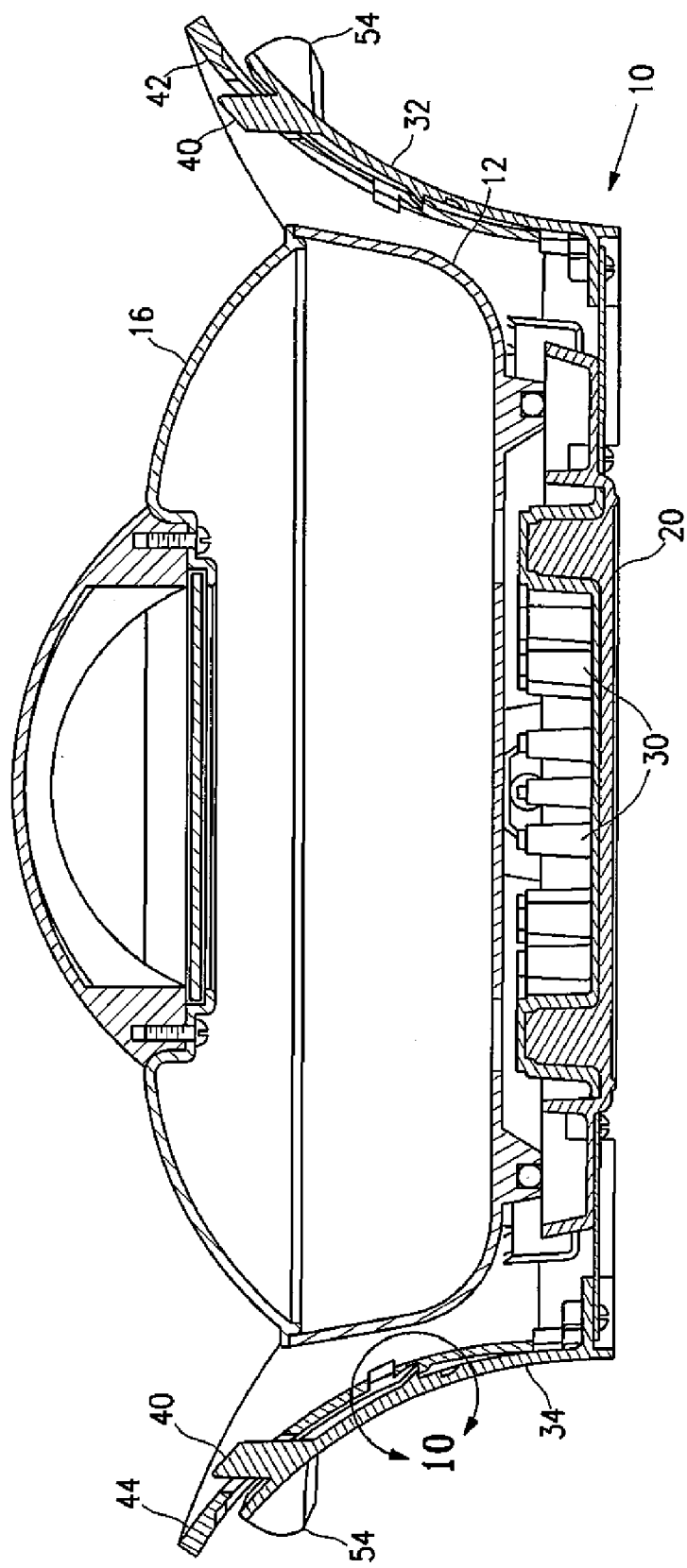
FIG. 9 is a sectional view of the cooker of FIG. 1 similar to that of FIG. 7 but with the drip tray latched in the lowered position in which the apertures in the bottom of the pan are open.
Figure 10:
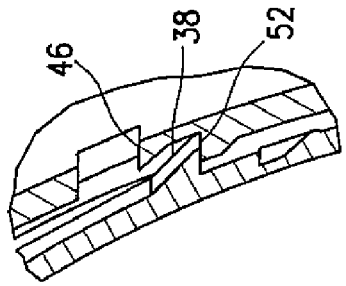
FIG. 10 is a detailed view of a portion of the sectional view of FIG. 9, illustrating the manner in which the tab of the spring loaded latch engages and seats on a lower ledge of the mating latch receiving bracket.

Movement of the drip tray 20 from the raised position to the lowered position is initiated by pushing each of the knobs 40 to overcome the spring resistance of the spring loaded latches 32 and 34 and unseat the tabs 38 from the upper ledges 46. This allows the spring loaded latches 32 and 34 to slide in a downward direction so that the drip tray 20 is then positioned in the lowered position. The lowered position is shown in FIG. 9. In the lowered position, the upstanding lugs 30 are withdrawn from the apertures 28 in the bottom 26 of the pan 12. As shown in the detailed view of FIG. 10, the tabs 38 of the spring loaded latches 32 and 34 engage lower ledges 52 formed beneath the upper ledges 46 in the facing surfaces of the latch receiving brackets 42 and 44.

Movement of the drip tray 20 to the raised position is initiated by lifting a pair of handles 54 formed on each of the spring loaded latches 32 and 34 opposite the knobs 40. This raises the spring loaded latches 32 and 34 and the attached drip tray 20, so that the tabs 38 on the spring loaded latches 32 and 34 rise up to and seat within the upper ledges 46 in the latch receiving brackets 42 and 44. Upon release of the handles 54, the drip tray 20 remains in the raised position due to the resilient action of the spring loaded latches 32, and 34.

By pushing on the knobs 40 so as to overcome the resilient resistance of the spring loaded latches 32 and 34, the tabs 38 may be moved clear of both the upper and lower ledges 46 and 52 to permit separation of the spring loaded latches 32 and 34 and the drip tray 20 from the latch receiving brackets 42 and 44 of the pan 12. This facilitates cleaning of the pan 12 and the drip tray 20. Where desired, the pan 12 and the drip tray 20 may be placed in a dishwasher for cleaning.

In a typical cooking operation, meat is placed in the bottom 26 of the pan 12. An electrical element (not shown) embedded within the bottom 26 of the pan 12 is connected to a current source to provide heat for cooking the meat. The drip tray 20 is moved into the lowered position by actuation of the latching mechanisms 22 and 24. This opens the apertures 28 in the bottom 26 of the pan 12 so that greases, juices and fats from the meat may flow through the apertures 28 and onto the drip tray 20.

The cook may then want to add sauce to the meat. To prevent escape of the sauce through the apertures 28, the latching mechanisms 22 and 24 are actuated to raise the drip tray 20 to the raised position.

Figure 11:
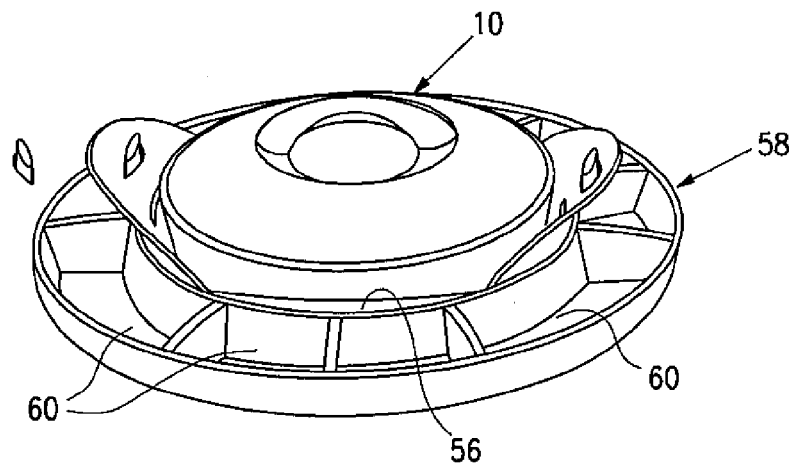
FIG. 11 is a perspective view of the cooker of FIG. 1 mounted within a serving tray.
Figure 12:
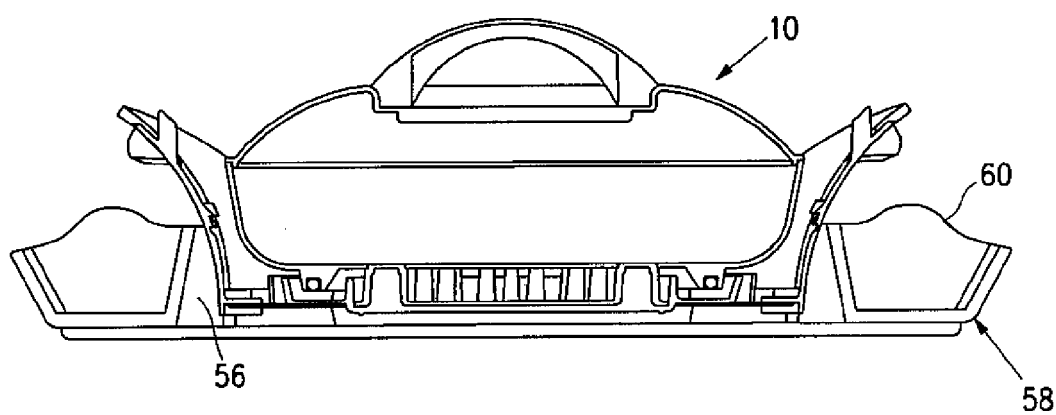
FIG. 12 is a sectional view of the arrangement of FIG. 11.

When cooking is completed, the cooker 10 may be placed within a serving tray. This is shown in FIGS. 11 and 12 where the cooker 10 has been placed within a circular opening 56 in a serving tray 58 of generally circular configuration. The serving tray 58 includes a plurality of trays 60 which are removably located about the circumference of the serving tray 58. Toppings and other foods which are used in connection with the serving of the cooked food in the cooker 10 may be placed in the removable trays 60.

The cooker 10 and the serving tray 58 are ideally suited for preparing and serving tacos. The meat is cooked and flavored in the cooker 10, following which the cooker 10 is placed within the opening 56 in the tray 58 and the lid 16 is removed. The meat within the pan 12 is put into taco shells, following which lettuce, tomatoes, sauce, and other toppings which have been placed in the individual trays 60 of the serving tray 58 are placed over the meat within the taco shell. However, it will be understood that other food dishes can be cooked and served using the cooker 10 and the serving tray 58.

What is claimed is:

1. A cooking appliance comprising a pan having a bottom with apertures therein, a drip tray disposed beneath the bottom of the pan; means for moving the drip tray vertically between engaged and disengaged positions relative to the pan, and a plurality of upstanding lugs on the drip tray extending into and closing the apertures in the bottom of the pan when the drip tray is in the engaged position, the upstanding lugs being positioned away from the apertures to open the apertures when the drip tray is in the disengaged position.

2. A cooking appliance comprising a pan having apertures therein, a drip tray disposed beneath the pan, means for moving the drip tray into and out of engagement with the pan, means on the drip tray for closing and opening the apertures in the pan when the drip tray is moved into and out of engagement with the pan, and a serving tray having an opening therein for receiving the pan and the drip tray, the serving tray having a plurality of food compartments therein disposed around the pan and the drip tray when the pan and the drip tray are placed in the opening of the serving tray.

3. A cooking appliance comprising a pan having apertures therein, a drip tray disposed beneath the pan, means for moving the drip tray into and out of engagement with the pan, means on the drip tray for closing and opening the apertures in the pan when the drip tray is moved into and out of engagement with the pan, the means for moving the drip tray including latching mechanisms for selectively latching the drip tray into engaged and disengaged positions relative to the pan, and the latching mechanisms including a pair of latches resiliently mounted on opposite sides of the drip tray and a pair of mating portions mounted on opposite sides of the pan, the latches resiliently engaging the mating portions in either of two positions to place the tray in the engaged and disengaged positions relative to the pan.

4. A cooking appliance comprising the combination of:
  a generally circular pan having an open upper end and a plurality of apertures in a bottom thereof;
  a generally circular lid removably positioned over the open upper end of the pan;
  a generally circular drip tray positioned beneath the bottom of the pan and having a plurality of upstanding lugs thereon;
  a pair of latch receiving brackets mounted on opposite sides of the pan; and
  a pair of spring loaded latches mounted on opposite sides of the drip tray and each latching to a different one of the pair of latch receiving brackets in either raised or lowered positions, the drip tray being held in a raised position relative to the drip pan in which the lugs extend into and close off the apertures when the latches are latched in the raised positions and being held in the lowered position relative to the drip pan in which the lugs are removed from the apertures when the latches are latched in the lowered positions.

5. A cooking appliance according to claim 4, wherein each of the pair of spring loaded latches includes a leaf spring extending from a lower end thereof and mounted on the drip tray, the leaf springs biasing the latches into engagement with associated ones of the pair of latch receiving brackets.

6. A cooking appliance according to claim 5, wherein each of the pair of spring loaded latches has a tab projecting from a side thereof adjacent an associated one of the pair of latch receiving brackets, and wherein each of the pair of latch receiving brackets has upper and lower ledges on a side thereof adjacent an associated one of the pair of latches, the tabs of the pair of spring loaded latches engaging the upper ledges of the pair of latch receiving brackets to hold the drip tray in the raised position relative to the pan, and the tabs of the pair of spring loaded latches engaging the lower ledges of the pair of latch receiving brackets to hold the drip tray in the lowered position relative to the pan.

7. A cooking appliance according to claim 6, wherein each of the pair of latch receiving brackets has an aperture therein and each of the pair of latches has a knob thereon extending into the aperture of an associated one of the pair of latch receiving brackets, whereby application of pressure to the knobs overcomes the resistance of the spring-loaded latches to unseat the tabs from the upper or lower ledges of the pair of latch receiving brackets to permit repositioning of the drip tray relative to the pan.

8. A cooking appliance according to claim 4, further including a serving tray of generally circular configuration and having a generally circular opening therein for receiving the pan together with the drip tray therein, the serving tray having a plurality of removable food trays disposed thereon about the circumference thereof around the drip tray.

* * * * *